United States Patent
Kim et al.

(10) Patent No.: US 10,259,344 B2
(45) Date of Patent: Apr. 16, 2019

(54) FOLDING SEAT ACTUATOR

(71) Applicants: Hyundai Motor Company, Seoul (KR); Daedong Movel System Co., Ltd., Siheung-si (KR)

(72) Inventors: Young Dong Kim, Seongnam-si (KR); Sang Ho Kim, Incheon (KR); Sang Soo Lee, Gunpo-si (KR); Yun Soo Kim, Incheon (KR); Myoung Soo Chang, Incheon (KR); Yeong Sik Joo, Siheung-si (KR); Heung Suk Yang, Hwaseong-si (KR); Young Gu Kang, Bucheon-si (KR); Young Bae Kim, Suwon-si (KR)

(73) Assignees: Hyundai Motor Company, Seoul (KR); Daedong Movel System Co., Ltd., Siheung-si (KR)

( * ) Notice: Subject to any disclaimer, the term of this patent is extended or adjusted under 35 U.S.C. 154(b) by 671 days.

(21) Appl. No.: 14/946,439

(22) Filed: Nov. 19, 2015

(65) Prior Publication Data

US 2016/0355104 A1 Dec. 8, 2016

(30) Foreign Application Priority Data

Jun. 2, 2015 (KR) .................. 10-2015-0078061

(51) Int. Cl.
*B60N 2/02* (2006.01)
*B60N 2/36* (2006.01)

(52) U.S. Cl.
CPC ............ *B60N 2/0232* (2013.01); *B60N 2/36* (2013.01); *B60N 2002/0236* (2013.01)

(58) Field of Classification Search
CPC ........ E05B 81/06; E05B 81/34; E05F 15/603; B60N 23/0232; B60N 2/36; B60N 2002/0236
USPC ......................... 74/25, 500.5, 505
See application file for complete search history.

(56) References Cited

U.S. PATENT DOCUMENTS

| | | | | | |
|---|---|---|---|---|---|
| 4,478,099 | A | * | 10/1984 | Hess | E05F 11/426 74/505 |
| 5,704,687 | A | * | 1/1998 | Klingler | A47C 7/465 297/284.4 |
| 6,185,868 | B1 | * | 2/2001 | Kato | E05F 15/627 192/35 |
| 8,011,269 | B2 | | 9/2011 | Elliot et al. | |
| 9,097,311 | B2 | * | 8/2015 | Fujisawa | F16H 35/10 |

(Continued)

FOREIGN PATENT DOCUMENTS

EP 2 163 790 B1 7/2014
JP 2008-265596 A 11/2008

(Continued)

*Primary Examiner* — William C Joyce
(74) *Attorney, Agent, or Firm* — Morgan, Lewis & Bockius LLP

(57) ABSTRACT

A folding seat actuator may include a wire configured to be coupled to a seat back or a seat cushion, a coiling gear connected to the wire configured to fold a seat by winding the wire around the coiling gear when the coiling gear is rotated, a reduction gear interlocked with the coiling gear to rotate the coiling gear, a power source for providing rotational force to the reduction gear, and an elastic body for providing rotational force to the reduction gear such that the reduction gear is restored to a set position after rotating by the power source.

5 Claims, 4 Drawing Sheets

(56) References Cited

U.S. PATENT DOCUMENTS

2006/0191369 A1* 8/2006 Cockerham .......... B60N 2/0232
74/500.5
2007/0209857 A1   9/2007 Wolf

FOREIGN PATENT DOCUMENTS

| JP | 2008-285114 A | 11/2008 |
| JP | 2010-274903 A | 12/2010 |
| KR | 10-2011-0080092 A | 7/2011 |

* cited by examiner

FOLDING SEAT ACTUATOR

CROSS-REFERENCE(S) TO RELATED APPLICATIONS

The present application claims priority to Korean Patent Application Number 10-2015-0078061 filed Jun. 2, 2015, the entire contents of which is incorporated herein for all purposes by this reference.

BACKGROUND OF THE INVENTION

Field of the Invention

Exemplary embodiments of the present invention relate to a folding seat actuator; and, particularly, to a folding seat actuator for enabling a seat folding system to be automatically implemented.

Description of Related Art

In a conventional vehicle seat, particularly, in a rear seat of a high-occupancy vehicle, the seat is designed to be foldable for securing an interior space of the vehicle depending on the purpose of use. Such a conventional seat is foldable by unlocking of a seat back through an operation of a locking lever installed to the seat back in an unfolded state of the seat back.

Incidentally, an electronic remote folding system capable of powering a seat back of a vehicle by a motor has been recently used due to a consumer demand for a more comfortable seat back and an easy operation thereof of a seat back. In this regard, the electronic remote folding system using the motor is implemented by a conventional seat back actuator, disclosed in a related art, including three or more gears for reducing rotation speed of a motor, a wire installed to the last gear, and an elastic spring for restoring the wire.

However, the related art may not resolve a problem in which the actuator has a large size due to use of the three or more gears. In addition, since substantial elastic restoring force is required to reversely rotate the three or more reduction gears engaged with each other for restoring the wire, the elastic spring has an increased length and an elastic body having high rigidity is used. For this reason, the actuator may be costly and have an increase in weight.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a folding seat actuator capable of reducing a load required for an elastic body and having a reduced size.

According to various aspects of the present invention, a folding seat actuator may include a wire configured to be coupled to a seat back or a seat cushion, a coiling gear connected to the wire configured to fold a seat by winding the wire around the coiling gear when the coiling gear is rotated, a reduction gear interlocked with the coiling gear to rotate the coiling gear, a power source for providing rotational force to the reduction gear, and an elastic body for providing rotational force to the reduction gear such that the reduction gear is restored to a set position after rotating by the power source.

The reduction gear may have external gear teeth formed along an outer peripheral portion thereof to be engaged with the power source, and an internal gear protruding from a center thereof to be engaged with an outer peripheral portion of the coiling gear.

The reduction gear may have a first surface groove formed on a first surface thereof such that the elastic body is inserted into the first surface groove, both ends of the elastic body are respectively coupled to the reduction gear and a housing for supporting rotation of the reduction gear, and the elastic body is compressed when the reduction gear is normally rotated by the power source while reversely rotating the reduction gear when the elastic body is restored.

The elastic body may be coupled to a first surface of the reduction gear, the reduction gear may have a second surface groove formed on a second surface thereof such that the internal gear is inserted into the second surface groove, and an end of the internal gear may be inserted and fixed into the second surface groove so that the internal gear rotates along with the reduction gear.

A plurality of flanges may radially protrude from the end of the internal gear, and the flanges may be inserted and fixed into the second surface groove.

The folding seat actuator may further include a housing for supporting rotation of the reduction gear and the coiling gear, in which the coiling gear and the housing may further include stoppers coming into contact with each other so as to limit the rotation of the coiling gear.

The elastic body may be a spiral spring.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
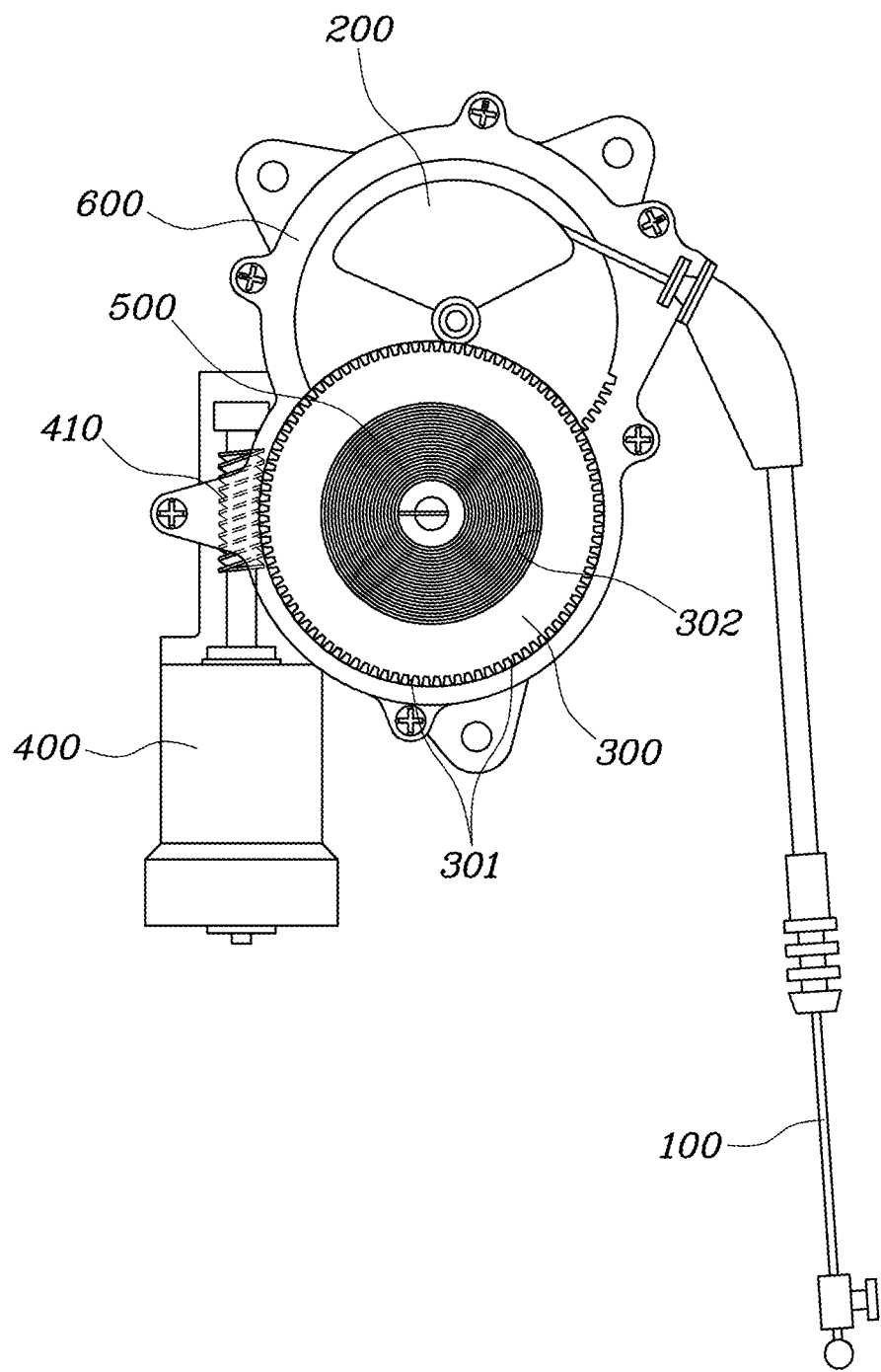
FIG. 1 is a view illustrating a configuration of an exemplary folding seat actuator according to the present invention.

FIG. 1 is a view illustrating a configuration of a folding seat actuator according to various embodiments of the present invention. The folding seat actuator according to various embodiments of the present invention includes a wire 100 coupled to a seat back or a seat cushion, a coiling gear 200 connected to the wire 100 for folding a seat by winding the wire 100 around the coiling gear 200 when the coiling gear 200 is rotated, a reduction gear 300 interlocked with the coiling gear 200 to rotate the coiling gear 200, a power source 400 for providing rotational force to the reduction gear 300, and an elastic body 500 for providing rotational force to the reduction gear 300 such that the reduction gear 300 is restored to a set position after rotating by the power source 400.

Specifically, one end of the wire 100 is coupled to the seat back and the other end thereof is coupled to the coiling gear 200. Accordingly, the wire 100 pulls the seat back when the coiling gear 200 is rotated, thereby enabling the seat back to be folded.

In addition, the folding seat actuator further includes a housing 600 provided with the coiling gear 200, the reduction gear 300, and the power source 400. The housing 600 is directly coupled to the seat cushion or a vehicle body or is supported through a separate connection bracket, so that the seat back may be folded depending on the pulling of the wire 100. Of course, one end of the wire 100 may be coupled to the seat cushion or the connection bracket and the housing 600 may be coupled to the seat back, according to a designer's intention. Therefore, the folding seat actuator may be configured in various manners for folding the seat back.

Figure 2:
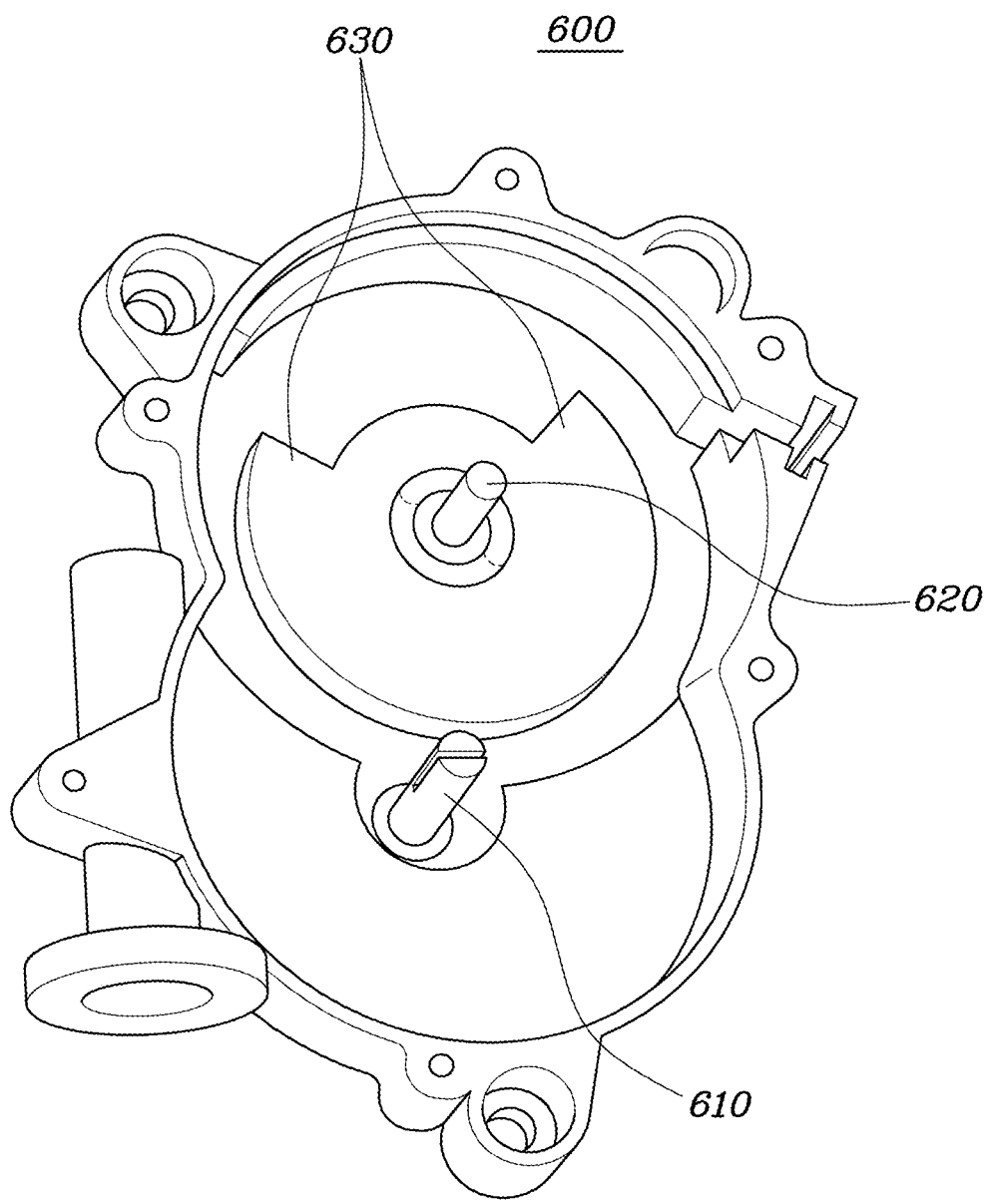
FIG. 2 is a view illustrating a housing of the exemplary folding seat actuator according to the present invention.

Meanwhile, FIG. 2 is a view illustrating the housing of the folding seat actuator according to the embodiment of the present invention. The housing 600 may include first and second protrusions 610 and 620 protruding such that the reduction gear 300 and the coiling gear 200 may be rotatably coupled thereto, respectively. The reduction gear 300 and the coiling gear 200 have holes formed at respect centers thereof so as to be respectively inserted and coupled to the first and second protrusions 610 and 620. Thus, the reduction gear 300 and the coiling gear 200 may be rotatably supported by the housing 600 by freely rotating about the respectively coupled protrusions. Rolling properties of the coupled gears may be improved by coupling bearings to outer peripheral portions of the first and second protrusions 610 and 620 according to a designer's intention.

The reduction gear 300 in which the first protrusion 610 is inserted will be described in more detail. As illustrated in FIG. 1, the reduction gear 300 has external gear teeth 301 formed along an outer peripheral portion thereof and may be engaged with the power source 400. The power source 400 may be a motor, preferably, a DC motor, so as to reduce manufacturing costs.

A worm gear 410 is coupled to a rotary shaft of the motor and a helical gear is formed as the external gear teeth 301 of the reduction gear 300. Thus, impact and noise generated when the worm gear is engaged with the helical gear may be reduced, and deceleration between the power source 400 and the reduction gear 300 may be performed. Moreover, since a separate gear for additional deceleration need not be installed in addition to the reduction gear 300, the whole size and cost of the actuator may be reduced and noise and vibration generation due to addition of the gear may be suppressed.

Meanwhile, the reduction gear 300 has a first surface groove 302 formed on one surface thereof such that the elastic body 500 may be inserted into the first surface groove 302. Both ends of the elastic body 500 may be respectively coupled to the reduction gear 300 and the housing 600 for supporting rotation of the reduction gear 300, preferably, to the first protrusion 610. Consequently, the elastic body 500 may be compressed when the reduction gear 300 is normally rotated by the power source 400 and power for reverse rotation of the reduction gear 300 may be provided when the elastic body 500 is restored.

The elastic body 500 may be various springs or be made of a material for provision of elastic force. Preferably, the elastic body 500 may be a leaf spring in the form of a spiral spring. Since the elastic body 500 is directly installed to the reduction gear 300 according to the use of the spiral spring, a separate space or case for installation of the elastic body 500 as in the related art need not be formed inside or outside the housing 600. Thus, the whole size of the actuator may be compact.

In addition, when power supply from the power source 400 is completed, the elastic body 500 rotates and restores the reduction gear 300 directly connected to the power source 400. Thus, the restoration of the reduction gear 300 may be performed with less force compared to a case in which the coiling gear 200 decelerated many times is decelerated.

When the gear is restored to an original position by installing the elastic body to the last gear as in the related art, power transfer opposite to deceleration is performed. Therefore, the power source should be reversely rotated at speed equal to or similar to the normal rotation thereof. To achieve this, the elastic body should have high elastic force. Thus, the actuator has a structure in which the elastic body has high rigidity and an increased length.

Accordingly, the present invention has a configuration in which the elastic body 500 is installed to the reduction gear 300 and directly performs reverse rotation of the reduction gear 300. Therefore, the above load may be reduced and restoring force may be sufficiently provided even though the rigidity of the elastic body 500 is reduced.

Meanwhile, the reduction gear 300 may have an internal gear 310 which protrudes from a center thereof and is engaged with an outer peripheral portion of the coiling gear 200.

Figure 3A:
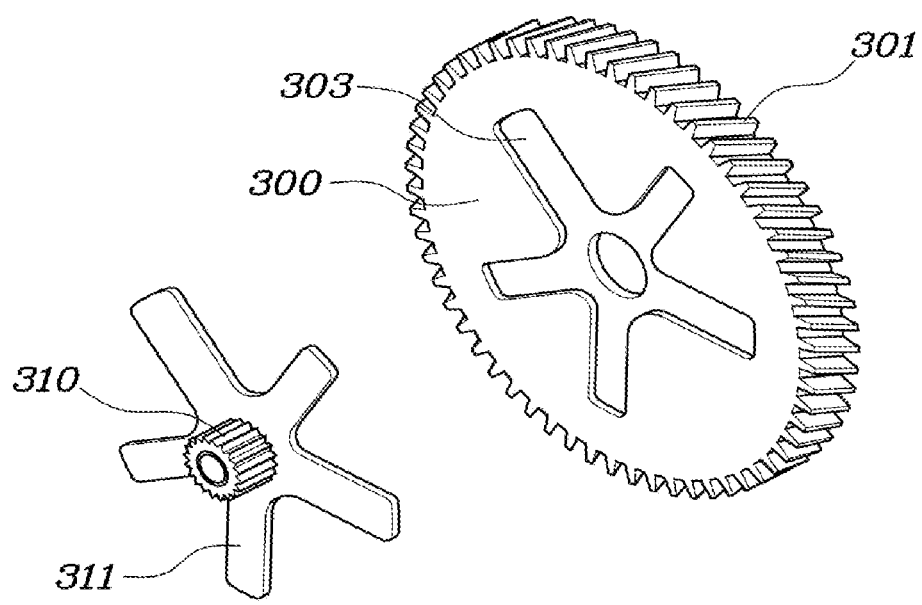
FIG. 3A and FIG. 3B are views illustrating an assembly between a reduction gear and an internal gear according to the present invention.
Figure 3B:
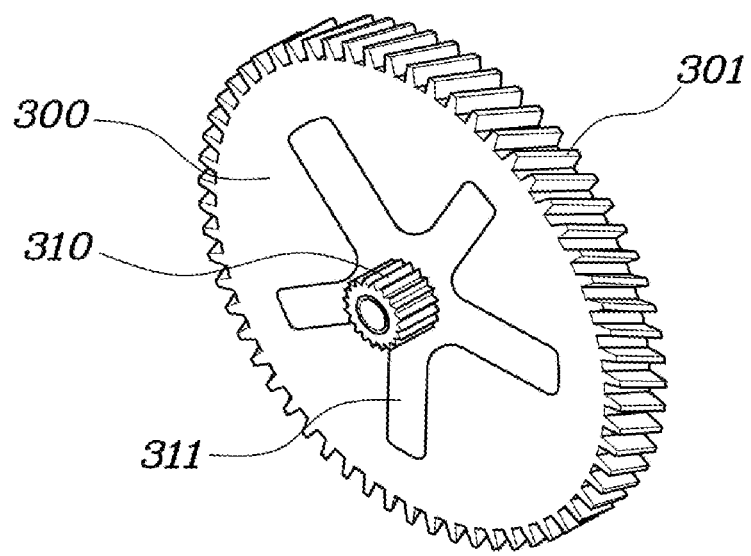

Specifically, FIG. 3A and FIG. 3B are views illustrating an assembly between the reduction gear and the internal gear. As illustrated in FIG. 3A, the reduction gear 300 has a second surface groove 303 formed on the other surface thereof such that the internal gear 310 may be inserted into the second surface groove 303. As illustrated in FIG. 3B, an end of the internal gear 310 is inserted and fixed into the second surface groove 303 so that the internal gear 310 may rotate along with the reduction gear 300.

Although the internal gear 310 is integrally coupled to the reduction gear 300 to be rotatable therewith, it is preferable that the internal gear 310 is separately manufactured from the reduction gear 300 and is assembled thereto for easy assembly and simplification of production.

The internal gear 310 preferably has gear teeth formed around a protruding column thereof. It is preferable that a plurality of flanges 311 radially protrudes from the end of the internal gear and is fixed into the second surface groove 303 by various methods such as insertion, adhesion, bolting, and welding. The flanges 311 may be arranged at intervals set by the designer, and each flange 311 may be formed perpendicular to the internal gear 310.

The internal gear 310 may have a through-hole which is longitudinally formed at a center thereof. It is preferable that the through-hole is matched with the hole formed at the center of the reduction gear 300 and the first protrusion 610 is coupled to the through-hole through with the hole.

Figure 4:
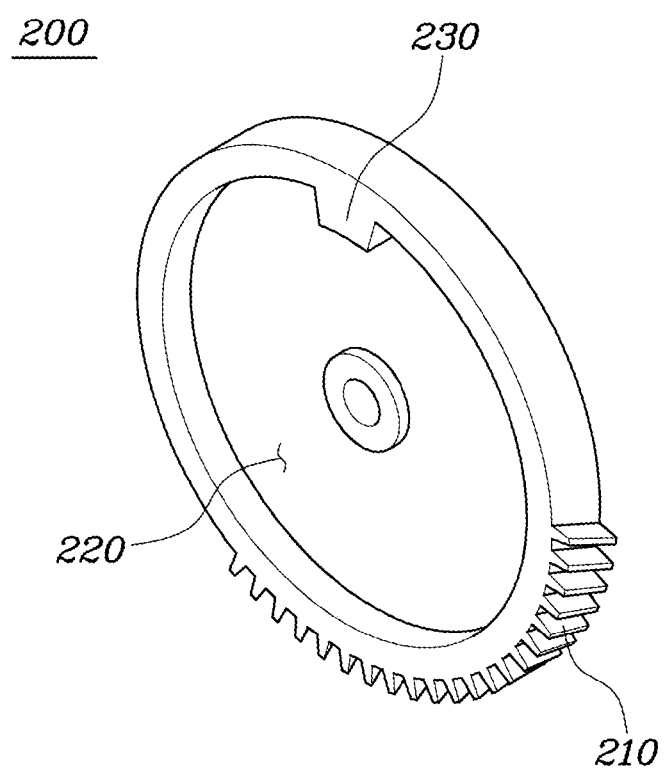
FIG. 4 is a view illustrating a coiling gear of the exemplary folding seat actuator according to the present invention.

Meanwhile, FIG. 4 is a view illustrating the coiling gear of the folding seat actuator according to the embodiment of the present invention. The coiling gear 200 may have gear teeth 210 formed at the outer peripheral portion thereof so as to be engaged with the internal gear 310. The gear teeth 210 of the coiling gear 200 may be formed to surround the entirety of the outer peripheral portion of the coiling gear 200. However, since the coiling gear 200 has a limited rotation range, the gear teeth 210 may be partially formed within a range in which the coiling gear is actually rotated. The length and the like of the gear teeth 210 may be variously set according to a designer's intention.

In addition, the coiling gear 200 and the housing 600 may further include stoppers 230 and 630 which come into contact with each other so as to limit rotation of the coiling gear 200. The coiling gear 200 has a groove 220 formed at one surface thereof and the stopper 230 of the coiling gear 200 may be arranged in the groove 220. The stoppers 630 of the housing 600 may come into contact with the stopper 230 of the coiling gear 200 in a state inserted into the groove 220.

A point of contact between the stopper 230 of the coiling gear 200 and the stoppers 630 of the housing 600 may be set depending on the limited rotation range of the coiling gear 200, similarly to the gear teeth 210 of the coiling gear 200. The stoppers 230 and 630 may have various forms. However, it is preferable that the coiling gear 200 has one stopper and the housing 600 has a pair of stoppers 630 arranged at intervals set depending on the rotation range of the coiling gear 200 as illustrated in FIG. 2.

Through provision of the stoppers 230 and 630, excessive rotation of the power source and thus excessive winding of the wire 100 may be prevented. In addition, each gear may be prevented from being excessively rotated and the wire 100 may be prevented from being excessively unwound across the restoration point when the gear and the wire 100 are restored.

In accordance with the folding seat actuator having the above-mentioned structure, the load required for the elastic body may be reduced, the elastic body may be miniaturized, and the actuator may be compact.

In addition, the number of used gears may be reduced through the primary deceleration between the power source and the reduction gear and the secondary deceleration between the reduction gear and the coiling gear. Consequently, the actuator may be manufactured at low cost and be compact.

In addition, since the stoppers are provided to limit the operation ranges of the power source, the gears, and the wire, uniform operation force may be always secured within the set range.

In accordance with a folding seat actuator according to exemplary embodiments of the present invention, a load required for an elastic body can be reduced, the elastic body can be miniaturized, and the actuator can be compact.

In addition, the actuator can be manufactured at low cost and be compact through a reduction in the number of used gears.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A folding seat actuator comprising:
   a wire configured to be coupled to a seat back or a seat cushion;
   a coiling gear connected to the wire configured to fold a seat by winding the wire around the coiling gear when the coiling gear is rotated;
   a reduction gear interlocked with the coiling gear to rotate the coiling gear;
   a power source for providing rotational force to the reduction gear; and
   an elastic body for providing rotational force to the reduction gear such that the reduction gear is restored to a set position after rotating by the power source,
   wherein the reduction gear has external gear teeth formed along an outer peripheral portion thereof to be engaged with the power source, and a small gear protruding from a center of the reduction gear to be engaged with an outer peripheral portion of the coiling gear,
   wherein the elastic body is coupled to a first surface of the reduction gear and the reduction gear has a first groove formed on a second surface of the reduction gear, and
   wherein a plurality of flanges radially protrudes from an end of the small gear, and the flanges of the small gear are inserted and continuously fixed into the first groove of the second surface of the reduction gear for the small gear to continuously rotate with the reduction gear.

2. The folding seat actuator of claim 1, wherein the reduction gear has a second groove formed on the first surface thereof such that the elastic body is inserted into the second groove, both ends of the elastic body are respectively coupled to the reduction gear and a housing for supporting rotation of the reduction gear, and the elastic body is compressed when the reduction gear is normally rotated by the power source while reversely rotating the reduction gear when the elastic body is restored.

3. The folding seat actuator of claim 1, further comprising a housing for supporting rotation of the reduction gear and the coiling gear, wherein the coiling gear and the housing further include stoppers coming into contact with each other so as to limit rotation of the coiling gear.

4. The folding seat actuator of claim 1, wherein the elastic body comprises a spiral spring.

5. The folding seat actuator of claim 1, wherein the first groove of the second surface has a shape to match a shape of the flanges.

\* \* \* \* \*